United States Patent

Hasler

[11] Patent Number: 5,988,960
[45] Date of Patent: Nov. 23, 1999

[54] HOLDER FOR PLURALITY OF WORKPIECES

[76] Inventor: James J. Hasler, 50 Donna La., Forestville, Conn. 06010

[21] Appl. No.: 09/094,160

[22] Filed: Jun. 9, 1998

[51] Int. Cl.⁶ .................................................. B23D 7/08
[52] U.S. Cl. .............................. 409/219; 82/125; 82/162; 409/903; 414/226.01; 414/736; 483/14; 901/6
[58] Field of Search ..................................... 409/219, 223, 409/903; 483/14; 269/211; 82/124, 125, 129, 162; 414/226.01, 736; 901/6

[56] References Cited

U.S. PATENT DOCUMENTS

| | | | |
|---|---|---|---|
| 2,339,800 | 1/1944 | Obecny | 409/903 |
| 3,678,790 | 7/1972 | Riley | 82/162 |
| 3,771,509 | 11/1973 | Murchie | 125/11 R |
| 4,462,748 | 7/1984 | Inaba et al. | 82/125 |
| 4,579,514 | 4/1986 | Repella | 425/124 |
| 4,608,747 | 9/1986 | Link et al. | 82/125 |
| 4,614,469 | 9/1986 | Beere et al. | 409/902 |
| 4,688,321 | 8/1987 | Smith | 409/903 |
| 5,897,275 | 4/1999 | Sella | 483/14 |

FOREIGN PATENT DOCUMENTS 1524991  11/1989  U.S.S.R. ................. 409/903

*Primary Examiner*—Daniel W. Howell
*Assistant Examiner*—Christopher Kirkman
*Attorney, Agent, or Firm*—McCormick, Paulding & Huber LLP

[57] ABSTRACT

A CNC machine tool has a plurality of collet chucks in a fixture that requires loading workpieces in these collets by hand. The workpieces are first assembled on a loading bar or holder so they can be collectively loaded in the ganged collet chuck for machining in the CNC machine. The holder has spaced stations, and each station includes a standard base adapter and an individualized parts adapter that fits onto the base adapter. Each parts adapter will be configured to accept a part to be machined.

5 Claims, 3 Drawing Sheets ics, or CNC machines.

HOLDER FOR PLURALITY OF WORKPIECES

The present invention relates generally to providing a convenient holder for supporting a plurality of workpieces to be held in a ganged or multiple collet chuck of the type used in present day computer controlled machine tools, or CNC machines.

The object of the present invention is to provide a convenient holder, or loading bar, for supporting a plurality of workpieces to be loaded into a linear array of collets in a multi-collet fixture or ganged chuck of the type adapted to support a plurality of workpieces so that they can be subjected to one or more operations by a movable turret that is programmed by the computer controlled machine to travel between successive stations defined by each of these collet chucks in order to perform a series of operations on each of the workpieces in turn.

SUMMARY OF THE INVENTION

In accordance with the present invention, an elongated bar is provided of approximately the same length as a single bank or row of ganged collet chucks in a multi-collet fixture. This elongated bar accommodates a number of workpieces, corresponding in number to the collet chucks in the multi-collet fixture. Such multi-collet fixtures may be of the type manufactured by Beere Precision Products of Racine, Wis.

The holding bar of the present invention is adapted to support each of the workpieces in a convenient assembly that can be used with other such assemblies to load or unload parts from such a multi-collet fixture. The holder is preferably in the form of a bar that defines a plurality of threaded openings spaced apart a convenient distance, and each threaded opening receives the threaded shank of a machine screw or shoulder bolt that in turn supports a base adapter which is spring loaded to a predetermined outer limit position defined by the shoulder of the bolt or fastener. The base adapter has an annular recess for receiving an individualized parts adapter that can be fabricated to receive workpieces of predetermined geometry. As a result, the base adapter is used as a standard component so that only the parts adapter configuration need be designed to accept a particular workpiece configuration in the job to be run.

Each individual part to be machined is held in place in its parts adapter that mates with a base adapter so that the workpieces are loaded into the individual collet chucks in one convenient motion. The workpieces can be worked on in the computer controlled machine tool, and after the desired machining steps on the workpieces has been completed, the loading bar can again be used for unloading, that is to remove the parts from the individual collets. The machine operator will have loaded additional parts in a second loading bar while the machine was operating on the first set of workpieces thereby reducing machine downtime.

DETAILED DESCRIPTION

Figure 1:
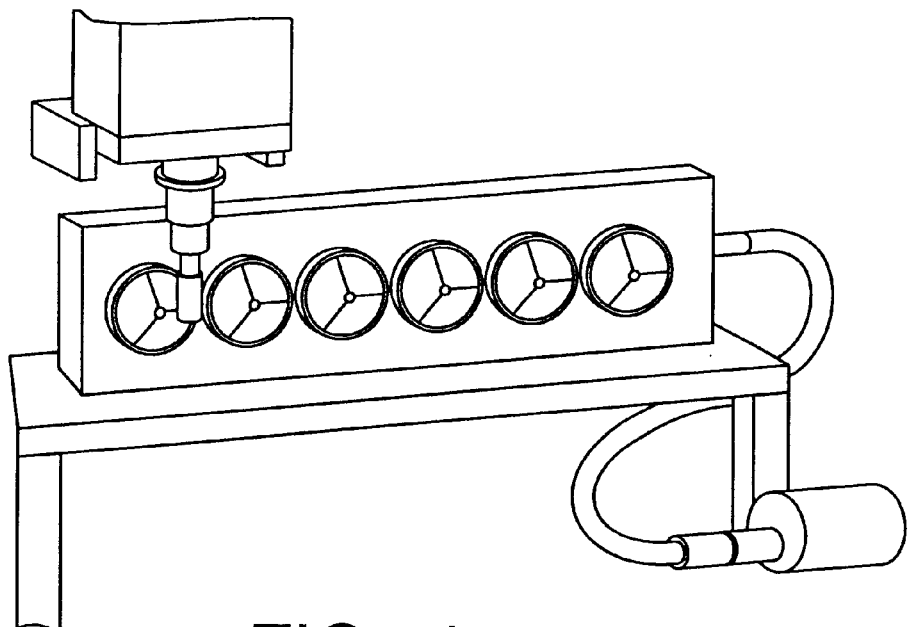
FIG. 1 is a schematic representation of a CNC machine showing a tool station that is movable by computer control for purposes of working on a number of individual workpieces or parts (not shown) supported in a linear array of collet chucks. The collet chuck fixture is supported in the machine and is hydraulically actuated for purposes of gripping the workpiece parts once they have been placed in the collets.

A typical ganged collet chuck, or multi-collet fixture, is illustrated in FIG. 1 having a plurality of collet chucks adapted to support a plurality of workpieces (not shown) that are each in turn adapted to be subjected to cutting operations by a spindle in the CNC machine that is programmed for movement precisely between these stations, to perform the desired cutting operations as dictated by the program in the computer controlled machine.

As mentioned previously, a typical multi-collet fixture of the type shown in FIG. 1 can be obtained from a number of different sources including Beere, the company mentioned previously from Racine, Wis. In a gang chuck or multi-collet fixture, the collets are provided at a standard spacing, usually two inches on center. Air or hydraulic clamping is available for operation of theses collet chucks and the collets are typically provided with positive stops internally so as to assure some degree of uniformity in the positioning of the parts to be clamped therein. However, precise clamping is not necessary, as once the CNC machine has been instructed to perform a particular operation, the machine stores in its own internal memory the precise position for the part for purposes of this and subsequent operations.

Where the collets are arranged as shown in FIG. 1, that is in a vertical plane such that the workpieces must be manually inserted horizontally but for the use of a loading bar according to the present invention, it will be apparent that one or more of the workpieces could move relative to its collet as a result of manually placing the parts in the six collets shown.

Figure 2:
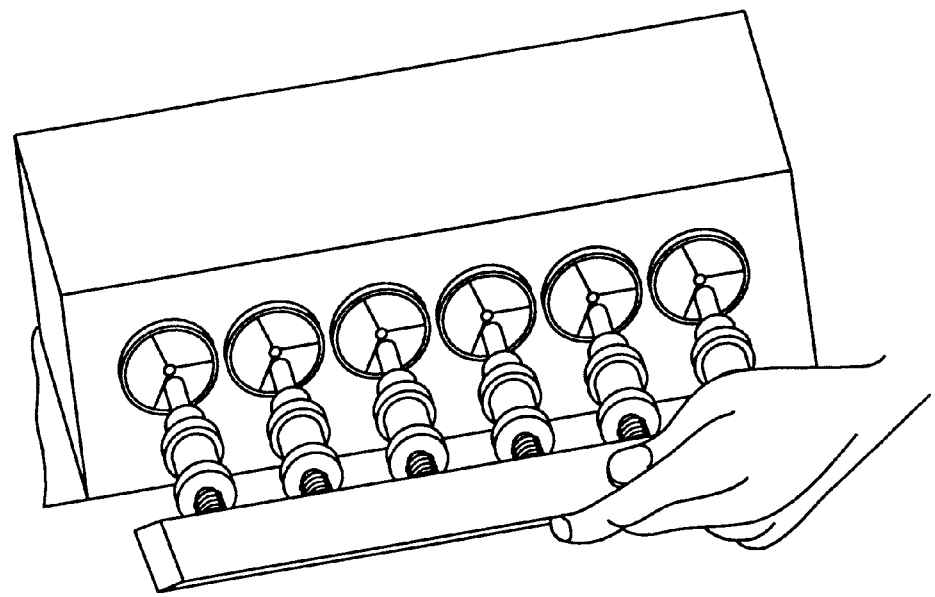
FIG. 2 is a view similar to FIG. 1 illustrating a loading bar of the present invention being used to load six workpiece parts in the six collet chuck fixture of FIG. 1.

In accordance with the present invention, and as shown in FIG. 2, the workpieces are first provided on a loading bar to be described, as a result of which they can be readily inserted in their associated collets in one efficient motion by the machine operator, as suggested in FIG. 2.

Figure 3:
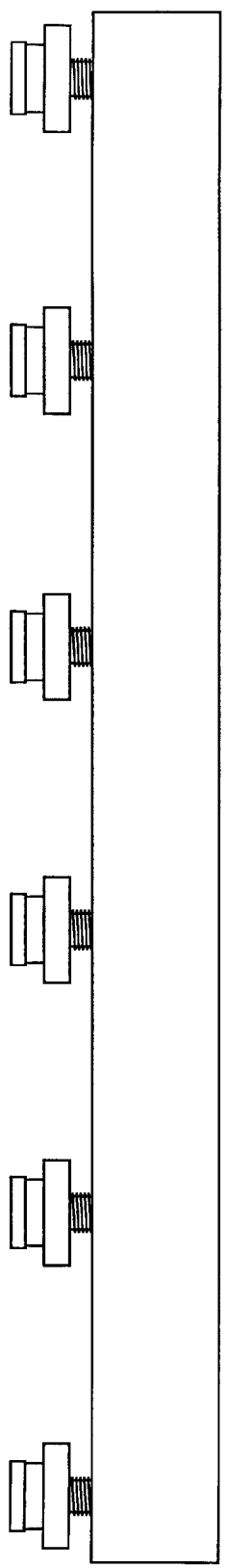
FIG. 3 is an elevational view of the loading bar shown in FIG. 2 without the parts adapters and without the workpiece parts.

Turning now to a more detailed description of the loading bar configuration itself, FIG. 3 shows the loading bar with six base adapters mounted therein. Each such base adapter is preferably spring loaded for movement toward and away from the bar and includes an annular flanged portion that is adapted to receive a parts adapter (not shown) that is especially suited for supporting and retaining the individual part to be machined.

Figure 4:
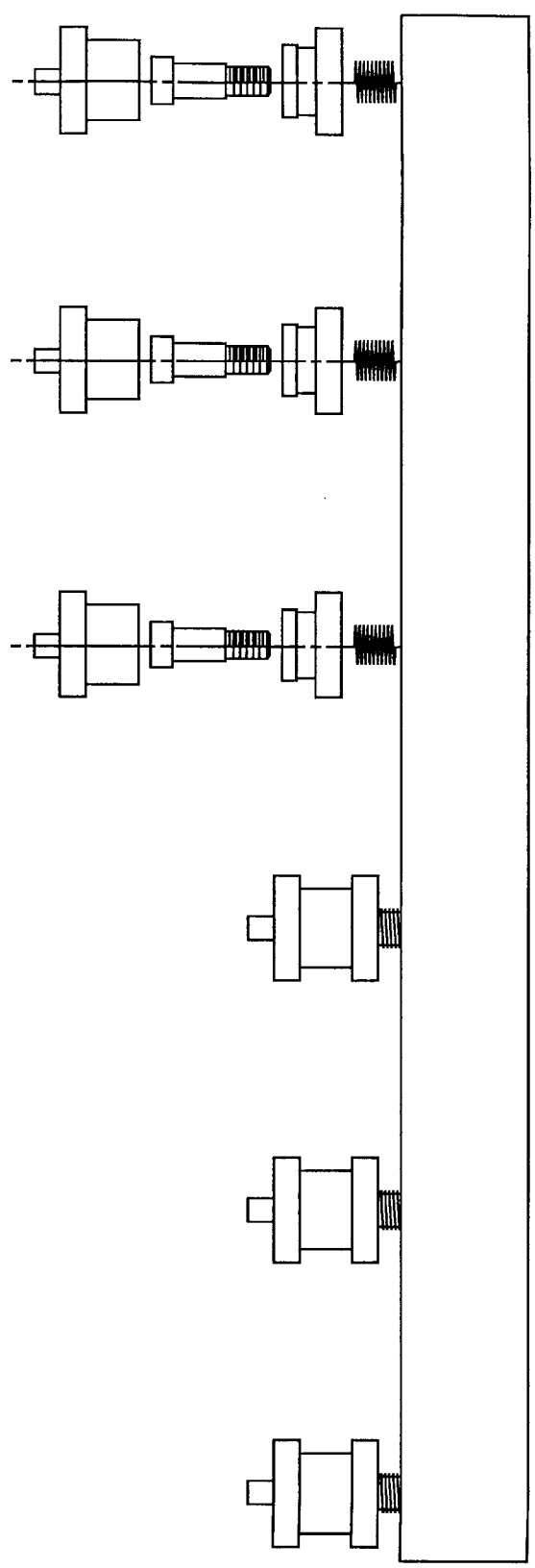
FIG. 4 is a view of the loading bar of FIG. 3 with parts adapters provided on three of the six adapters shown, and the adapters of the other three shown in exploded relationship.

FIG. 4 shows in exploded relationship three of the six adapters each with its associated mounting screw and spring, and with an individualized parts adapter also shown. Three adapter assemblies 18 are shown in assembled relationship at the left hand portion of FIG. 4.

Figure 5:
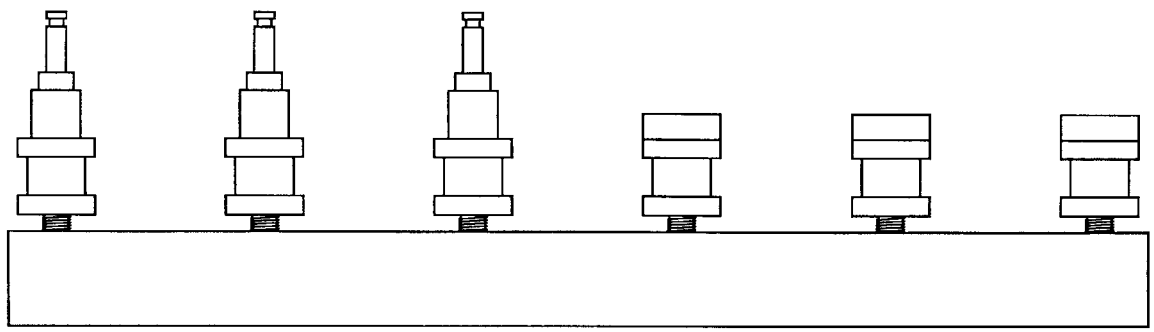
FIG. 5 is a view similar to FIGS. 3 and 4, but illustrating three parts of one type, and three parts of a different configuration all supported in the parts adapters of FIG. 4.

FIG. 5 is similar to FIG. 4 but also shows the workpieces or parts held in these adapter assemblies 18.

Figure 6:
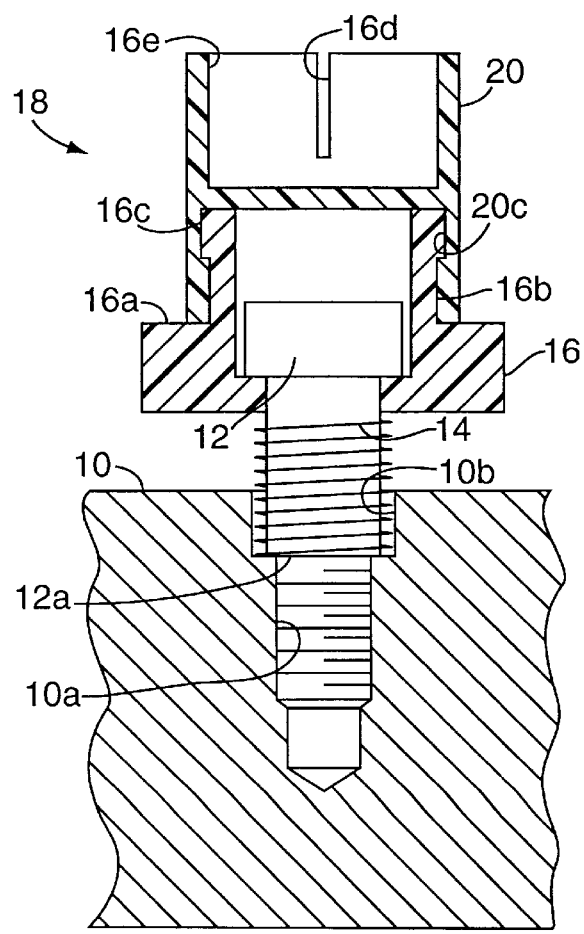
FIG. 6 is a vertical section taken generally through the loading bar of FIG. 1 showing one station of the six station loading bar of the present invention.

FIG. 6 shows an adapter assembly 18 having a parts adapter 20 that is configured for receiving a part such as that illustrated in the left hand portion of FIG. 5. The right hand portion of the loading bar illustrated in FIG. 5 is intended to support a generally annular shaped part and therefor the parts adapter employed in the right hand portion of FIG. 5 corresponds to the parts adapters illustrated in FIG. 4.

Turning now to a more detailed description of FIG. 6, a single station of the multi-station loading bar is shown. The loading bar 10 defines a threaded bore 10a which receives a stud or shoulder bolt 12. The bolt 12 is machined to have an enlarged shank portion 12a that seats the bolt against a recessed opening 10b in the loading bar, allowing clearance for a compression spring 14 acting between the base adapter 16 and this recessed opening 10b in the loading bar 10.

The adapter assembly 18 includes a base adapter 16 having an annular flange 16a, as well as an upstanding boss 16b. The external surface of the boss 16b and the internal surface of the parts adapter 20 are releasably secured to one another as a result of a slightly raised annular rib portion 16c of the base adapter 16 that fits into a slightly enlarged groove 20c formed for this purpose in the parts adapter 20 as best shown in FIG. 6.

As so constructed and arranged, the base adapter 16 is of standard configuration, and adapted to receive any one of a number of parts adapters 20, such as that shown in FIG. 6, and such as that shown in FIG. 4 for example.

FIG. 5 shows at the left hand side, the parts adapter 20 of FIG. 6, and at the right hand portion of FIG. 5, the parts adapter of FIG. 4 is shown for holding parts of slightly different configuration in the same loading bar.

In further accordance with the present invention, the parts adapter 20 defines an outwardly open recess 16e which is of a size determined by the shape and configuration of the workpiece or part to be machined. A degree of resiliency is imparted to this portion of the parts adapter 20 as a result of slots 16d provided in the side wall of this opening 16e in order to more readily receive the workpieces, as shown in FIG. 2 and as discussed previously.

Variations of the present invention will occur to those skilled in this art. For example, the parts adapter 20 may take any of a number of configurations, as dictated only by the variety of parts which are to be machined. More particularly, the parts adapter 20 need be standardized only to the extent that it must be releasably securable to the base adapter 16. Although an external interlocking relationship is provided in the base adapter 20 to achieve this end, it will be apparent that this configuration could be reversed, and the boss 16b might instead be provided with an internal annular rib for engaging a complementary shaped external groove on the base of the parts adapter. Similarly, if desired in certain situations, the base adapter need not be of generally cylindrical configuration as shown, but might instead have an irregular shape such as a polygon shape or other convenient shape, as long as the parts adapter base has a shape and size complementary to that of the base adapter. The adapter assembly 18 has interfitted adapters 16 and 20 that are preferably molded of polymeric material so to have a degree of resistance and flexibility that allows them to be readily assembled as shown in FIG. 6, or disassembled to achieve alternative configurations.

In operation, the holder of the present invention provides for loading a plurality of parts into a collet type clamping fixture in one single motion, and allows for unloading the parts by simply reversing this procedure. If two or more loading bars are used, maximum efficiency is achieved. Parts can be inserted into a collet clamping device for the machining process, and when the machining is complete, the same holder can be placed over the parts, the clamping fixture released, and all of the machine parts removed at once. If a second bar has been previously loaded with parts while machining of the first group of parts is carried out machine downtime can be minimized. Thus, once the first group of parts have been machined, the second group will be ready for insertion into the collet clamping device. Meanwhile all of the parts will be kept in an orderly fashion in the loading bar so that the machined parts can be conveniently removed therefrom for further processing.

The compression springs located between the base adapters and the loading bar itself greatly facilitate loading as a result of assuring placement of each workpiece against an internal stop normally provided for this purpose within the collet clamping fixture. This feature of the present invention gives rise to significant advantages from the point of view that the stops within the collet clamping fixture need not be individually set up or adjusted so as to achieve precise positioning of the workpiece. Repeatability is very important in a computer controlled machine tool of the type with which such a collet clamping fixture is used. Precise positioning of the workpiece is necessary in the clamping fixture in order to assure proper machining of the workpiece during each step in the series of steps generally required to form a finished part.

Finally, it should be noted that the workpiece holding device of the present invention is a universal tool that can be used with collet clamping fixtures of various configurations. For example, if more than a single row of collets were provided in such a clamping fixture, a pair of loading bars might be provided in a loading bar assembly for use in loading all of the rows of collets at the same time.

In light of the foregoing disclosure and explanation, it is to be understood that within the scope of the appended claims, the invention may be practiced otherwise than as specifically described.

What is claimed is:

1. A workpiece holding device including a member defining a plurality of openings spaced apart by predetermined distances dictated by a workpiece clamping fixture that includes individual clamping devices for holding a plurality of such workpieces in a machine tool;

a plurality of studs provided in said openings;

base adapters carried by said studs, and mounted thereon for limited axial movement relative said studs;

biasing means provided between said member and said base adapters to urge said base adapters into a predetermined position relative to the member, each base adapter defining a projecting boss; and parts adapters each having a socket shaped to receive a workpiece, and each parts adapter including a base adapted to be received by a base adapter boss.

2. The combination according to claim 1, further characterized by means for retaining each parts adapter in assembled relationship with an associated base adapter.

3. The combination according to claim 1, further characterized by said socket portion of each parts adapter comprising an outwardly open cylindrical recess.

4. The combination according to claim 1, further characterized by each said socket portion of said parts adapter characterized by a projecting post adapted to received a workpiece to be machined.

5. The combination according to claim 1, wherein said base adapters and said parts adapters are fabricated from a polymeric material which is resiliently flexible enough to allow assembly of said base adapters and parts adapters as a result of an interference fit provided between an annular rib on one of said adapters and a recessed annular groove on the other of said adapters.

* * * * *